KEYED AGC CIRCUIT WITH MEANS FOR CONTROLLING HORIZONTAL SYNC PULSE LEVEL OF SIGNALS BELOW THE AGC THRESHOLD

Filed May 16, 1962 3 Sheets-Sheet 1

INVENTOR.
JACK AVINS
BY
Attorney

INVENTOR.
JACK AVINS
BY W. H. Sprangle
Attorney

| SIGNAL STRENGTH | CONTROL VOLTAGE | IMPEDANCE OF CONTROL DEVICE (OHMS) |
|---|---|---|
| ABOVE AGC THRESHOLD | NEGATIVE | MINIMUM |
| AT AGC THRESHOLD | ZERO | MINIMUM |
| BELOW AGC THRESHOLD | INTERMEDIATE POSITIVE | INTERMEDIATE |
| ZERO | MAXIMUM POSITIVE | MAXIMUM |
Fig. 4.
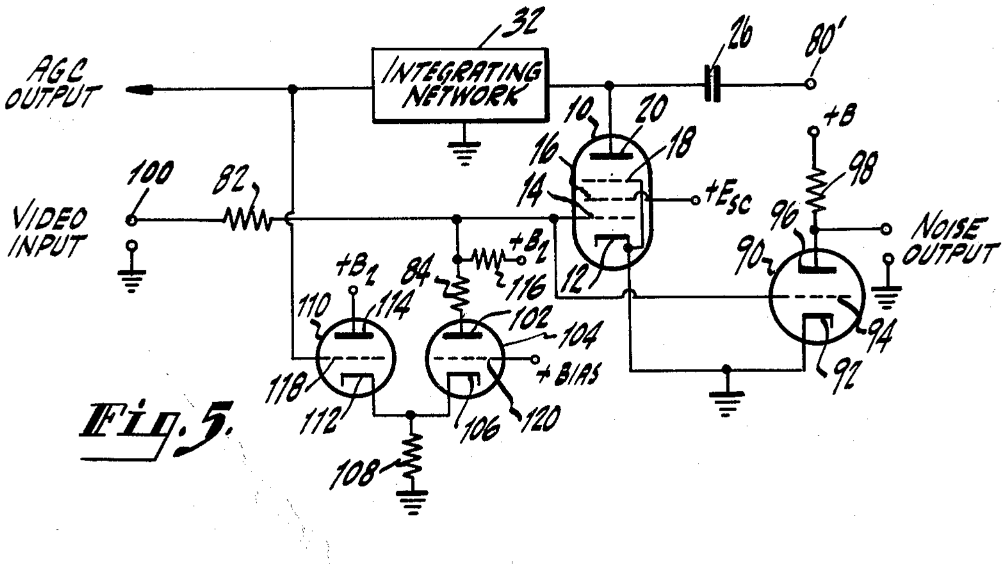
Fig. 5.
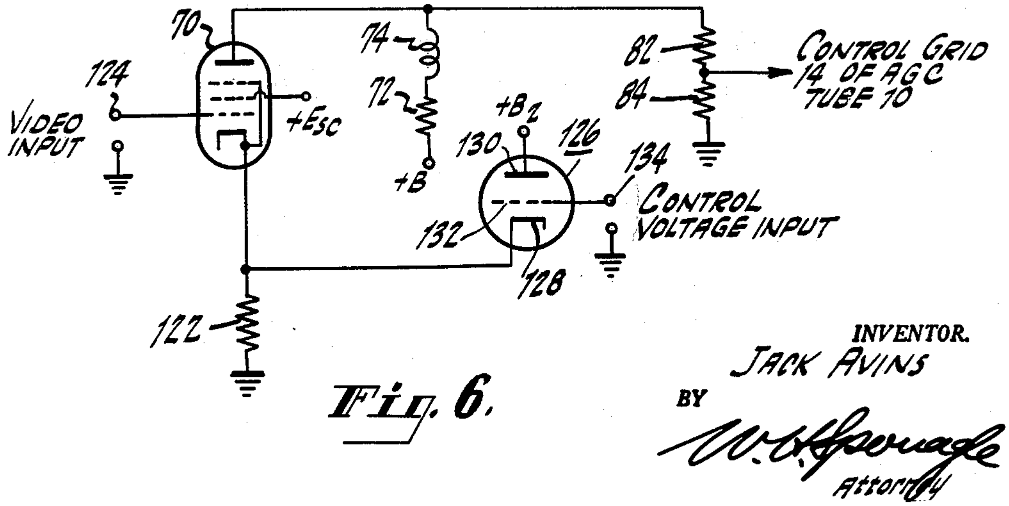
Fig. 6.
INVENTOR.
JACK AVINS
BY
[signature]
Attorney United States Patent Office
3,165,581
Patented Jan. 12, 1965

3,165,581

KEYED AGC CIRCUIT WITH MEANS FOR CONTROLLING HORIZONTAL SYNC PULSE LEVEL OF SIGNALS BELOW THE AGC THRESHOLD

Jack Avins, Staten Island, N.Y., assignor to Radio Corporation of America, a corporation of Delaware Filed May 16, 1962, Ser. No. 195,171
10 Claims. (Cl. 178—7.3)

This invention relates to television receivers, and more particularly to automatic gain control (AGC) circuits for such receivers.

Commercial television receivers generally employ some form of AGC for the radio frequency (RF) and intermediate frequency (IF) amplifiers of the receivers to maintain the amplitude of the video signals derived from the video detector of the receiver relatively constant, despite large variations in the strength of the television wave intercepted by the antenna.

One type of AGC circuit that is used in present day commercially available television receivers is a keyed AGC circuit, in which an amplifying device is keyed to condition it for conduction by pulse signals generated in the receiver, so that it can conduct only during the occurrence of the horizontal synchronizing signals of the video signals that are also applied to the amplifying device. When the horizontal synchronizing signals and the pulse signals occur in coincidence, a pulse of current is conducted by the amplifying device, which current pulse has an amplitude responsive to the amplitude of the synchronizing signals. The pulses of current are caused to generate pulses of voltage, which are integrated to derive a direct AGC voltage that has an amplitude responsive to the amplitude of the synchronizing signals. The horizontal synchronizing signals of the video signals are transmitted at a relatively fixed amplitude, as compared to the image portions of the video signals, which vary with the type of image being transmitted. The AGC voltage is thus a measure of the strength of the video signals. The AGC voltage is applied to the RF and IF amplifiers to control their gains.

A keyed AGC circuit has several advantages. It responds only to the horizontal synchronizing signals which are transmitted at a fixed amplitude, and is insensitive to changes in the average value of the video signals, which varies in amplitude in accordance with the type of scene being transmitted; it is relatively noise immune because the amplifying device that is generating the AGC voltage is operable only during the intervals of the keying pulse signals and noise occurring during other intervals cannot cause current flow in the device and thus cause an incorrect AGC voltage; and it amplifies the AGC voltage to increase its effectiveness in controlling the gain of the amplifying circuits of the receiver. In addition, the voltage value of the peaks of the horizontal synchronizing pulses is known, because the feedback operation of the usual AGC system holds the amplitude of the peaks of the horizontal synchronizing signals within a relatively narrow range at the input to the amplifying device. Thus, auxiliary receiver circuits, such as noise cancelling circuits, may be used effectively. Noise cancelling circuits, for instance, are generally designed to derive noise cancelling signals from noise signals that exceed the amplitude of the horizontal synchronizing signals.

Below a certain amplitude level of the received television wave, however, the detected video signals are not large enough to generate an AGC voltage, so that the amplifying circuits of the receiver are operating at a maximum gain. Such small video signals, although below the threshold at which an AGC voltage is developed, are nevertheless capable of reproducing an image on the cathode ray image reproducing tube of the receiver. It is thus desirable to have some means in the receiver for determining the position of the peaks of the horizontal synchronizing signals of the video signals, so that proper operation of auxiliary receiver circuits may be effected.

Briefly, in accordance with the invention, an automatic gain control (AGC) circuit in a television receiver is used to control the gain of certain signal amplifiers in the receiver, in the usual manner. The AGC circuit includes an amplifying device to which composite video signals and keying signals, at television horizontal deflection rate, are applied. Above a minimum, or threshold, amplitude of the video signals current conduction occurs in the device, and an automatic gain control voltage is developed. When the amplitude of the video signals is below the threshold level and would normally not cause current conduction in the device, a feedback circuit causes current conduction in the device but does not cause the generation of an appreciable AGC voltage. The conduction in the device maintains the peaks of the horizontal synchronizing signals of the video signals at a known reference level, and auxiliary receiver circuits, such as noise cancelling circuits, may be operated effectively below AGC threshold.

The invention may be better understood, however, when the following detailed description is read in connection with the accompanying drawings, in which:

FIGURE 4 is a chart itemizing certain operational characteristics of the circuit shown in FIGURE 3;

FIGURE 5 is a schematic circuit diagram of an automatic gain control circuit in a television receiver illustrating another embodiment of the invention; and FIGURE 6 is a schematic circuit diagram of a video amplifier circuit for a television receiver illustrating yet another embodiment of the invention.

Figure 1:
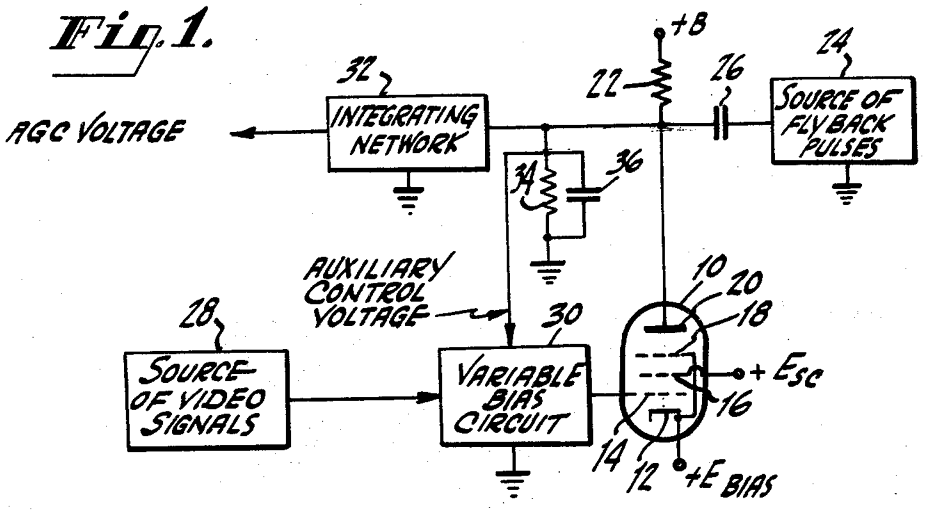
FIGURE 1 is a simplified circuit diagram illustrating the basic principles of the invention.

Referring now to the drawings, an automatic gain control amplifying device for a television receiver is illustrated, in FIGURE 1, as a pentode type tube 10, having a cathode 12, a control grid 14 or input electrode, a screen grid 16, a suppressor grid 18 and an anode 20 or output electrode. The screen grid 16 is connected to a source of screen grid operating voltage, $+E_{SC}$, and the suppressor grid 18 is connected internally of the tube 10 to the cathode 12. A source of positive bias voltage, $+E_{bias}$, is applied to the cathode 12. The cathode 12 is a common electrode to both the input and output circuits of the tube 10. The anode 20 is connected through an anode resistor 22 to a source of operating voltage, +B. The anode 20 is also connected to a source of horizontal flyback pulses 24 through a coupling capacitor 26. The source of flyback pulses 24, as is known, may be the horizontal deflection circuits of a television receiver.

A source of video signals 28 supplies the usual composite video signals, such as those detected and delivered by the second detector of a television receiver, through a variable bias circuit 30 to the control grid 14 of the AGC tube 10. The AGC voltage is taken from the anode 20 through an integrating network 32. An auxiliary control signal is also applied to the variable bias circuit 30 from a control resistor 34 connected between the anode 20 and ground, or point of reference potential, for the receiver. The control resistor 34 is shunted by a filter capacitor 36.

The operation of the circuit shown in FIGURE 1 is best described by considering two conditions: the first condition exists when the video signals from the source of video signals 28 have an amplitude that is at or above AGC threshold, that is, when the video signals have sufficient amplitude to overcome the positive bias, $+E_{bias}$, on the cathode 12 of the AGC tube; and the second condition exists when the amplitude of the video signals is below AGC threshold, that is, when the amplitude of the video signals are insufficient to overcome the bias, $+E_{bias}$, of the cathode 12 of the AGC tube 10.

At or above AGC threshold, the video signals are direct coupled to the AGC tube 10, and thus include the direct current component of the signals. When a horizontal synchronizing signal pulse in the video signals occurs on the control grid 14 in coincidence with a flyback pulse on the anode 20, a pulse of current is conducted through the tube 10. The amount of current conducted in each pulse is responsive to the amplitude of the horizontal synchronizing signal pulse above the cutoff voltage of the tube 10. The amount conducted in each pulse is thus indicative of the strength of the video signals applied to the control grid 14. As is known, these pulses of current generate a voltage on the anode 20 which is integrated in the integrating network 32 and applied as the AGC voltage to the RF and IF amplifiers in the television receiver to control their gains, and control the amplitude of the video signals applied to the AGC tube 10. Above AGC threshold, the auxiliary control signal has negligible effect on the variable bias circuit 30.

Figure 2:
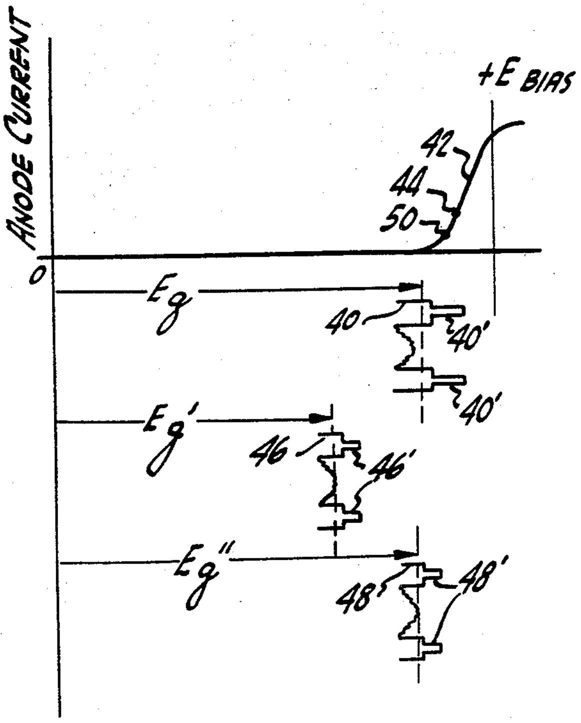
FIGURE 2 is a graph showing curves illustrating certain operational features of the circuit of FIGURE 1.

The condition that exists above AGC threshold is indicated as the waveform 40 in FIGURE 2. The curve 42 of FIGURE 2 is a plot of the anode current of the tube 10 against the voltage applied to control grid 14 and cathode 12 of the tube 10. The $+E_{bias}$ voltage on the cathode 12 is shown as the vertical line labeled $+E_{bias}$. The direct voltage component of the waveform 40 is labeled $E_g$ and extends from the zero voltage axis to the average value of the waveform 40 indicated by the dashed line. The horizontal synchronizing signal pulses 40′ of the waveform 40 are sufficiently positive to cause a pulse of current to flow in the tube 10 of an amount indicated at point 44 on the curve 42. The pulse of current, as has been previously explained, is used to generate the AGC voltage.

In known AGC circuits, if the amplitude of the video signals should drop below AGC threshold, current is not conducted in the tube 10 at any time and no AGC voltage is developed. The RF and IF amplifiers are therefore operating at maximum gain. One such condition is illustrated by the waveform 46 in FIGURE 2. The direct voltage component of the waveform 46 is labeled $E_g'$. Note that the horizontal synchronizing signal pulses 46′ of the waveform 46 do not reach an amplitude sufficiently large to cause current conduction in the tube 10. Note further that no indication of the position of the peak of the horizontal synchronizing signal pulses 46′ is possible below AGC threshold in known AGC circuits, since the amplitude of the waveform 46 could become much smaller than it is or large enough to barely cause current conduction in the tube 10 without affecting the output of the AGC tube.

In accordance with the invention, below AGC threshold the auxiliary control signal causes the variable bias circuit 30 to vary the bias voltage between the cathode 12 and control grid 14 to cause conduction in the AGC tube 10 on the peaks of the horizontal synchronizing signal pulses. The auxiliary control signal may be merely the AGC voltage itself, as explained hereinafter, or it may be a separate control signal as shown in FIGURE 1. The anode resistor 22 and the control resistor 34 are connected in series between the source of operating potential, +B, and ground for the receiver. Thus, in the absence of an AGC voltage, which is a negative voltage in this circuit, a small positive control voltage is developed across the control resistor 34. The variable bias circuit 30 when activated by a positive control voltage generated across the resistor 34 increases the direct positive voltage of the control grid 14 and forces the peaks of the synchronizing pulses of the video signals into a conducting region of the tube 10. This is illustrated by the waveform 48 in FIGURE 2. The waveform 48 is substantially the same as the waveform 46, except that its direct voltage component has been increased from $E_g'$ (waveform 46) to a larger value $E_g''$ (waveform 48) by the action of the variable bias circuit 30. The horizontal synchronizing signal pulses 48′ of the waveform 48 cause current conduction in the tube 10 to a value indicated by the point 50 on the curve 42. This current causes a small negative voltage to be developed which reduces, slightly, the control voltage. The gains of the RF and IF amplifiers of the receivers are not affected by the small negative voltage, since the total voltage at the anode is still positive. The voltage at the peaks of the synchronizing pulses of the video signals is known, however, and other circuits, such as noise cancelling circuits, may therefore be used effectively in the receiver.

Figure 3:
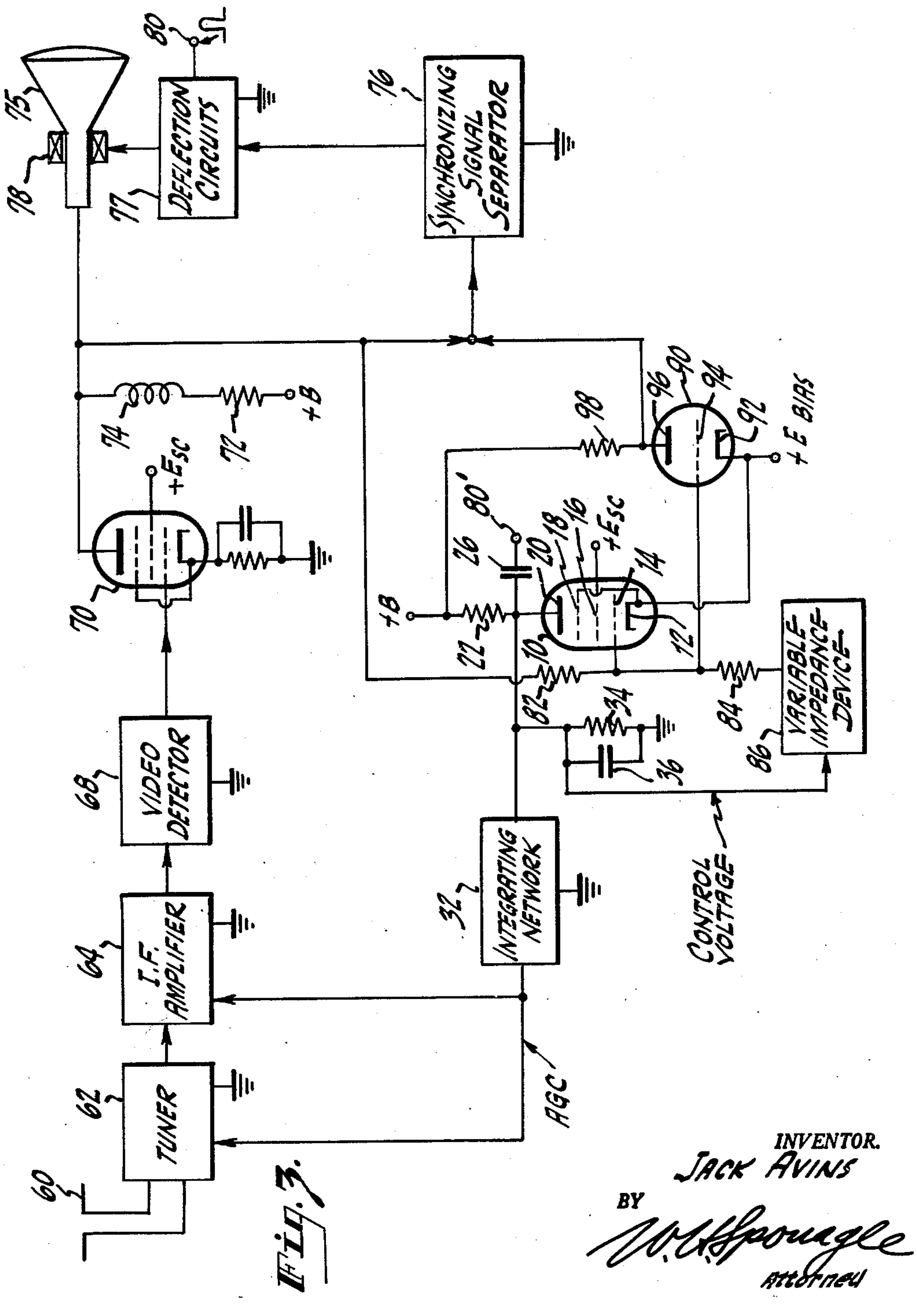
FIGURE 3 is a schematic circuit diagram, partly in block form, illustrating one embodiment of the invention.

An example of a noise cancelling circuit used in conjunction with the invention is shown in FIGURE 3, which is a schematic diagram of a television receiver that includes an antenna 60 for intercepting and supplying a radio frequency (RF) television wave to a tuner 62 for the receiver, where the wave is amplified and heterodyned to an intermediate frequency (IF) wave. The IF wave is applied to an IF amplifier 64 where it is amplified and applied to a video detector 68 to demodulate the composite video signals from the IF wave. The detected video signals are negative-going, that is, the horizontal synchronizing signal pulses are more negative than the remainder of the video signals. The video signals from the video detector 68 are applied to the control grid of a video amplifier tube 70 where they are amplified and developed across a video load circuit, which includes a load resistor 72 and a high frequency peaking coil 74, connected between the anode of the video amplifier tube 70 and a source of operating potential, +B. The amplified video signals are positive-going signals, and are applied from the anode of the video amplifier tube 70 to control the intensity of an electron beam generated in an electron gun (not shown) of a cathode ray image reproducing device 75. The video signals are further applied to a synchronizing signal separator circuit 76, which separates the vertical and horizontal synchronizing signal pulses from the video signals and applies them to deflection circuits 77 for the receiver to generate the proper currents to apply to an electromagnetic deflection yoke 78 for the cathode ray tube 75 to scan a television raster on its light reproducing screen (not shown). The deflection circuits 77 also generate a horizontal flyback pulse at the terminal 80.

The video signals from the video amplifier tube 70 are also applied through a voltage dividing network to the grid 14 of the AGC tube 10. The voltage dividing network comprises a first and second voltage dividing resistor 82 and 84, respectively, connected in series between the anode of the video amplifier tube 70 and a variable impedance device 86. The variable impedance device 86 is further connected to ground for the receiver. The remaining circuitry associated with the AGC tube 10 is identical to that shown and described in FIGURE 1 with the exception that the horizontal flyback pulse from the terminal 80 of the deflection circuits 77 is applied to the anode 20 of the tube 10 through a terminal 80′.

A noise inverter circuit is connected to the AGC tube 10 and includes a triode tube 90 having its cathode 92 connected directly to the cathode 12 of the AGC tube 10 and its control grid 94 connected directly to the control grid 14 of the AGC tube 10. Its anode 96 is connected to the source of operating potential, +B, through a noise load resistor 98. Negative-going noise signals, corresponding to noise signals appearing in the video signals which have amplitudes greater than the peaks of the horizontal synchronizing signal pulses of the video signals, appear at the anode 96, and are applied to the input of the synchronizing signal separator 76 to cancel the positive-going noise signals in the video signal applied to this point from the video amplifier 70 to prevent incorrect operation of the synchronizing signal separator 76 caused by noise.

Above AGC threshold the impedance of the variable impedance device 86 in the circuit of the control grid 14 of the AGC tube 10, is at a minimum. The amplitude of the video signals, including the direct component, that are applied to the control grid 14 of the AGC tube 10 is thus primarily determined by the relative values of the first and second voltage divider resistors 82, 84. An automatic gain control voltage is developed at the anode 20 of the AGC tube 10 in a manner described in connection with FIGURE 1, and is applied through the integrating network 32 to the tuner 62 and IF amplifier 64 to control the gain of the RF and IF amplifiers therein, and maintain the amplitude of the detected video signals from the video detector 68 substantially constant.

It will be noted that the bias, that is the direct voltage between control grid and cathode, is the same on the noise tube 90 as on the AGC tube 10. However, the characteristics of the two tubes and the circuits associated with the tubes are such that the horizontal synchronizing signal pulses of the video signals which cause conduction in the AGC tube 10, do not cause appreciable conduction in the noise tube 90. Only signals in excess of the amplitude of the horizontal synchronizing signal pulses of the video signals can cause appreciable conduction in the noise tube 90. The noise signals appear as positive-going noise signals between control grid 94 and cathode 92 of the noise tube 90, and are developed as negative-going noise cancelling signals at the anode 96. The negative-going noise cancelling signals are applied to the synchronizing signal separator 76 to cancel the positive-going noise signals contained in the positive-going video signals also applied to the synchronizing signal separator 76.

In prior art AGC circuits, if the video signals from the video amplifier 70 fall below AGC threshold the average current in the video amplifier tube 70 (which determines the direct component of the video signals) increases, thereby decreasing the direct component of the video signals, so that the horizontal synchronizing signal pulses can cause no current flow in the AGC tube 10 and, thus, the voltage position of the peaks of the horizontal synchronizing signal pulses is indeterminate and no effective noise cancelling signals are generated by the noise tube 90. In actual practice, below AGC threshold the noise tube 90 generates effective noise cancelling signals at its anode 96 only if the noise signals are large enough to substantially cut off the video amplifier 70.

However, in the circuit of FIGURE 3, below AGC threshold a control voltage, developed across the resistor 34, is applied to the variable impedance device 86. The variations in the impedance of the variable impedance device 86, under various control voltage conditions, are tabulated in FIGURE 4. If the signal strength is above AGC threshold, the AGC voltage, which is negative in polarity with respect to ground, cancels the small positive control voltage across the control resistor 34 and the net control voltage is negative, giving a minimum impedance for the variable impedance device 86. The impedance of the device 86 is also low at AGC threshold level when the net control voltage is zero. The AGC circuit, under these conditions, operates normally. The proportion of the video signals, including their direct voltage component, that is applied to the control grid 14 of the AGC tube 10 is determined by the ratio of the values of the first and second voltage divider resistors 82, 84.

At signal levels greater than zero but below AGC threshold level, the value of the control voltage is some positive voltage rising to a maximum positive value at zero signal strength. This action provides an impedance for the device 86 that rises from minimum to maximum as the control voltage rises toward its positive maximum. Thus, if the signal strength decreases below AGC threshold, the second voltage divider resistor 84 is effectively increased by the impedance of the variable impedance device 86 and a greater proportion of the direct component of the video signal is applied to the control grid 14 of the AGC tube 10. Because the video signals are direct coupled from the anode of the video amplifier tube 70, this action increases the voltage on the grid 14 of the tube 10, reducing the bias between the control grid 14 and cathode 12 of the AGC tube, and tends to force the peaks of the horizontal synchronizing signal pulses into the conduction region of the tube 10. The auxiliary feedback loop formed around the tube 10 by the control resistor 34 and the variable impedance device 86 tends to maintain the peaks in the conduction region of the tube 10. Because the peaks of the synchronizing pulse are thus fixed in the AGC tube 10, the noise tube 90 can operate normally to provide noise cancelling signals to the synchronizing signal separator 76. The variable impedance device 86 may be any one of many known devices, and as a particular example may be a transistor device as shown in Patent No. 2,544,211, issued on March 6, 1951, to L. E. Barton, and entitled Variable Impedance Device.

It will be appreciated that, as the impedance of the variable impedance device 86 increases to apply more of the direct component of the video signals to the control grid 14 of the AGC tube 10, it will also apply a larger proportion of the alternating component of the video signals to the control grid 14. This action aids the operation of the circuit in that it supplies more signal to the AGC tube 10.

Another embodiment of the invention is shown in FIGURE 5, which is a schematic diagram of the circuits of the AGC tube 10, and the noise tube 90. Video signals from the video amplifier tube 70 of FIGURE 3 are applied to a video input terminal 100 and across the voltage dividing network resistors 82, 84 in the same manner as in FIGURE 3. The control grid 14 of the AGC tube 10 is connected to the junction of the voltage divider resistors 82, 84. The circuit of FIGURE 5 is designed to operate directly from the AGC voltage rather than an auxiliary control voltage, and to this end, the anode 102 of a first triode control tube 104 is connected directly to the terminal of the voltage divider resistor 84 that is remote from the control grid 14 of the AGC tube 10, and the cathode 106 of the tube 104 is connected to ground for the receiver through a cathode resistor 108. A second triode control tube 110 has its cathode 112 also connected to ground through the resistor 108 and its anode 114 connected to a second source of operation voltage, $+B_2$. The junction of the voltage divider resistors 82 and 84 is connected to the second source of operating potential, $+B_2$, through a dropping resistor 116.

In operation, above AGC threshold, an AGC voltage is generated and applied to the control grid 118 of the second triode 110, which voltage is negative with respect to ground. The tube 110 is thus cut off by the negative AGC voltage on its control grid 118. A bias voltage, positive with respect to ground, is applied to the control grid 120 of the first control tube 104 to cause it to conduct and establish a normal bias and signal level at the control grid 14 of AGC tube 10, and the AGC operates normally.

Below AGC threshold, however, no negative AGC voltage is developed, and the second control tube 110 begins to conduct, reducing the conduction in the first control tube 104. As the current begins to decrease in the first control tube 104, its anode voltage begins to rise in a positive direction tending to make the direct voltage of the control grid 14 of the AGC tube sufficiently positive to allow the peaks of the horizontal synchronizing pulses to cause a slight amount of conduction in the AGC tube 10, and, as explained in connection with FIGURE 2, allowing the noise tube 90 to provide noise cancelling signals on noise signals in the video signals that exceed the peaks of horizontal synchronizing signal pulses.

The control voltage which is generated as shown in FIGURES 3 and 5 may be used to control the gain of a video amplifier tube, such as the video amplifier 70 of FIGURE 3, to accomplish the desired results. Such a circuit is shown in FIGURE 6 which includes the video amplifier tube 70 which has an unbypassed cathode resistor 122 connected between its cathode and ground for the receiver. Negative-going video signals are applied between ground and a video input terminal 124 connected to the control grid of the tube 70. Amplified video signals are developed across the video load circuit, including the resistor 72 and the peaking coil 74, connected between the anode 122 and the source of operating potential, B+. The first and second voltage divider resistors 82 and 84 are connected in series between the anode of the tube 70, and ground for the receiver, and their junction is connected to the control grid 14 of the AGC tube 10 of FIGURE 3 or 5. A triode control tube 126 has its cathode 128 connected directly to the cathode of the video amplifier tube 70 and its anode 130 connected directly to a second source of operating potential, $+B_2$. The control voltage which is derived as shown in FIGURE 3 or 5 is applied between ground and the control grid 132 of control tube 126 through a control voltage input terminal 134.

Above AGC threshold the control voltage is negative, as explained in connection with FIGURES 3 and 5, and the control tube 126 is cut off. Under these conditions, the AGC circuit and noise circuit operate normally, in the manner described in connection with FIGURES 3 and 5.

Below AGC threshold, however, the control voltage becomes zero or positive and the control tube 126 begins to conduct, causing the cathode potential of the video amplifier tube 70 to become more positive. This action reduces the current flow through the video amplifier tube 70, thus increasing the voltage, in a positive direction, at its anode. This action, in turn, increases the positive voltage across the voltage divider resistors 82 and 84, and increases the positive voltage at their junction, which is connected to the control grid 14 of AGC tube 10, forcing the AGC tube 10 into conduction on video signals normally below AGC threshold. The noise tube 90 may thus perform its function, and provide effective noise cancelling signals for the synchronizing signal separator used in the receiver.

What is claimed is:

1. In a television receiver having a source of composite video signals including regularly recurring horizontal synchronizing signals and a direct voltage component, the amplitude of which video signals may vary as the strength of the television wave received by said receiver varies, the combination comprising:
an amplifying device having first and second electrodes;
means for applying a direct bias voltage between said electrodes;
means for applying the composite video signals, including the direct voltage component, between said electrodes such that above a threshold level of the video signals the horizontal synchronizing signals on said electrodes cause current conduction in said device, and below said threshold level said synchronizing signals normally cause no current conduction in said device; and
means coupled to said amplifying device to derive a control signal responsive to the amplitude of said video signals and to vary the direct bias voltage on said electrodes by said control signal when said video signals are below said threshold level so that the synchronizing signals on said electrodes cause current conduction in said device.

2. In a television receiver having a source of composite video signals including regularly recurring horizontal synchronizing signals and a direct voltage component, the amplitude of which video signals may vary as the strength of the television wave received by said receiver varies, the combination comprising:
an amplifying device having input, output and third electrodes;
means for applying a direct bias voltage between said input and common electrodes;
means for applying the composite video signals, including the direct voltage component, between said input and third electrodes such that above a threshold level of the television wave applied to the video detector the horizontal synchronizing signals cause current conduction in said device to generate a voltage at said output electrode responsive to the amplitude of said video signals, and below said threshold level said synchronizing signals normally cause no current conduction in said device; and
means coupled to said output electrode and responsive to the amplitude of said video signals to vary the direct voltage between said input and third electrodes when said television wave applied the video detector is below said threshold level so that the synchronizing signals cause current conduction in said device.

3. In a television receiver having a source of composite video signal having regularly recurring horizontal synchronizing signals and a direct voltage component, said receiver further having a source of voltage pulses occurring in time coincidence with said horizontal synchronizing signals, the combination comprising:
an automatic gain control amplifying device having input, output, and third electrodes;
means for applying a direct bias voltage, positive with respect to a point of reference potential for said receiver, to said third electrode of said automatic gain control amplifying device;
means for applying said voltage pulses to the output electrode of said automatic gain control amplifying device;
means for applying the composite video signals, including the direct voltage component, to the input electrode of said automatic gain control amplifying device such that the horizontal synchronizing signals of the video signals having amplitudes above a threshold level on the input electrode of said automatic gain control amplifying device cause current conduction in said device and the generation of an automatic gain control voltage at the output electrode of said device, and below said threshold level said synchronizing signals cause no conduction in said device; and
means coupled to said output electrode and responsive to said composite video signals to vary the direct voltage on the input electrode of said automatic gain control amplifying device when the amplitude of said video signals is below said threshold level so that the synchronizing signals on the input electrode of said device cause current conduction in said device.

4. In a television receiver having a video detector for supplying composite video signals having regularly recurring horizontal synchronizing signals and a direct voltage component, said receiver further having a source of voltage pulses occurring in time coincidence with said horizontal synchronizing signals, the combination comprising:
an automatic gain control amplifying device having input, output, and third electrodes;
means for applying a direct bias voltage, positive with respect to a point of reference potential for said receiver, to said third electrode of said automatic gain control amplifying device;

means for applying said voltage pulses to the output electrode of said automatic gain control amplifying device;

means for applying the composite video signals, including the direct voltage component, from said video detector to the input electrode of said automatic gain control amplifying device such that video signals having amplitudes above a threshold level cause current conduction in said device and the generation of an automatic gain control voltage at the output electrode of said device, and video signals having amplitudes below said threshold level cause no substantial conduction in said device; and means coupled to said output electrode and responsive to said composite video signals to vary the direct voltage on the input electrode of said automatic gain control amplifying device when the amplitude of said video signals is below said threshold level so that the video signals cause current conduction in said device.

5. In a television receiver having a source of composite video signals, including the direct voltage component, and further including image portions and horizontal and vertical synchronizing signals and which may also include undesired noise signals;

said receiver further including a synchronizing signal separator circuit to which said composite video signals are applied for separating the horizontal and vertical synchronizing signals from said composite video signal; and also having a source of voltage pulses occurring in time coincidence with the horizontal synchronizing signals of said composite video signals, the combination comprising:

a signal amplifying device having input, output, and third electrodes;

means for applying said voltage pulse to the output electrode of said device;

means for applying the composite video signals to the input electrode of said device;

means for applying a direct voltage to the third electrode of said device to provide a bias voltage between said input and third electrodes such that the horizontal synchronizing signals of said composite video signals cause current conduction through said device when the amplitude of said composite video signals is greater than a threshold value;

means for deriving an automatic gain control voltage from the output electrode of said device;

a noise signal separator circuit responsive to said video signals and to the bias voltage between the input and third electrodes of said device for deriving noise cancelling signals from noise signals in said composite video signals that exceed the amplitude of the horizontal synchronizing signals;

means for applying said noise cancelling signals to said synchronizing signal separator circuit to prevent incorrect operation of said circuit by the noise signals in said composite video signals; and means responsive to the amplitude of said composite video signals for varying said bias voltage between said input and third electrodes of said signal amplifying device to cause conduction in said device when the amplitude of said composite video signals is less than said threshold value whereby said noise separator circuit may generate noise cancelling signals when the amplitude of said composite video signals is less than said threshold value.

6. In a television receiver having a video detector for supplying composite video signals, said signals having regularly recurring horizontal synchronizing signals and a direct voltage component, said receiver further having a source of voltage pulses occurring in time coincidence with said horizontal synchronizing signals, the combination comprising:

an automatic gain control amplifying device having input, output, and third electrodes;

means for applying said voltage pulses to said automatic gain control amplifying devices;

signal input circuit means for applying the composite video signals, including the direct voltage component from said video detector to the input electrode of said automatic gain control amplifying device such that video signals having amplitudes above a minimum threshold level cause current conduction in said automatic gain control amplifying device and the generation of an automatic gain control voltage at the output electrode of said device, and video signals having amplitudes below said threshold level normally cause no conduction in said device; and means coupled to said output electrode and responsive to the amplitude of said composite video signals for varying the direct voltage on the input electrode of said automatic gain control amplifying device when said television wave applied the video detector is below said threshold level so that the synchronizing video signals cause current conduction in said device.

7. In a television receiver having a source of composite video signals, said signals having regularly recurring horizontal synchronizing signals and a direct voltage component, said receiver further having a source of voltage pulses occurring in time coincidence with said horizontal synchronizing signals, the combination comprising:

an amplifying device having input, output, and third electrodes;

means for applying said voltage pulses to said automatic gain control amplifying device;

signal input circuit means for applying the composite video signals to the input electrode of said amplifying device and for biasing the input and third electrodes such that above a threshold amplitude of said video signals the horizontal synchronizing signals cause current conduction in said device and the generation of an automatic gain control voltage at the output electrode of said device, and below said threshold amplitude of said video signals said horizontal synchronizing signals normally cause no conduction in said device; and means coupled to said output electrode and responsive to the amplitude of said composite video signals for varying the biasing between input and third electrodes when the amplitude of said signals is below said threshold amplitude so that the horizontal synchronizing signals cause current conduction in said device.

8. In a television receiver having a source of composite video signals including regularly recurring horizontal synchronizing signals and a direct voltage component, the amplitude of which video signals may vary as the strength of the television wave received by said receiver varies, the combination comprising:

an amplifying device having first and second electrodes;

means for applying said composite video signals between said first and second electrodes and for biasing said first and second electrodes such that above a threshold amplitude of said video signals the horizontal synchronizing signals cause current conduction in said device, and below said threshold amplitude said synchronizing signals normally cause no current conduction in said device; and means coupled to said amplifying device to derive a control signal responsive to the amplitude of said video signals and for varying the biasing between said first and second electrodes by said control signal when the amplitude of said video signals is below said threshold level so that the synchronizing signals cause current conduction in said device.

9. In a television receiver having a source of composite video signals including regularly recurring synchronizing pulses, the amplitude of which video signals may vary as the strength of the television wave received by said receiver varies, and further including a source of voltage pulses occurring in synchronism with the synchronizing pulses of said video signals, the combination comprising:
  an automatic gain control rectifier device;
  means for applying voltage pulses from said source of voltage pulses to said device to condition said device for current conduction;
  means for applying said video signals to said device, so that the synchronizing pulses of video signals having amplitudes exceeding a threshold amplitude cause current conduction in said device to generate an automatic gain control signal from said device which is responsive to the amplitude of said video signals;
  and feedback means for said device to cause current conduction in said device on synchronizing pulses of video signals having amplitudes less than said threshold amplitude without the generation of a substantial automatic gain control signal from said device.

10. In a television receiver having a source of composite video signals including regularly recurring synchronizing pulses, the amplitude of which video signals may vary through a range above and below a threshold value, and further including a source of voltage pulses occurring in synchronism with the synchronizing pulses of said video signals, the combination comprising:
  an automatic gain control rectifier device;
  means for applying voltage pulses from said source of voltage pulses to said device to condition said device for current conduction;
  means for applying said video signals to said device, so that the synchronizing pulses of video signals having amplitudes above said threshold value cause current conduction in said device to generate an automatic gain control signal from said device which is responsive to the amplitude of said video signals;
  and feedback means for said device to cause current conduction in said device on synchronizing pulses of video signals below said threshold value without the generation of a substantial automatic gain control signal from said device.

References Cited in the file of this patent

UNITED STATES PATENTS

| | | |
|---|---|---|
| 2,921,130 | Jones | Jan. 12, 1960 |
| 3,005,870 | Ruby et al. | Oct. 24, 1961 |